United States Patent [19]
Goetz

[11] 3,887,213
[45] June 3, 1975

[54] INFLATABLE VEHICLE OCCUPANT RESTRAINT AND SYSTEM THEREFOR

[75] Inventor: George W. Goetz, Detroit, Mich.
[73] Assignee: Eaton Corp., Cleveland, Ohio
[22] Filed: Feb. 28, 1973
[21] Appl. No.: 336,862

[52] U.S. Cl............ 280/150 AB; 137/525; 251/61.1
[51] Int. Cl............................................ B60r 21/08
[58] Field of Search............ 280/150 AB; 137/525; 251/61, 61.1

[56] References Cited
UNITED STATES PATENTS

| | | | |
|---|---|---|---|
| 2,768,639 | 10/1956 | Stillwell | 137/525 X |
| 2,793,649 | 5/1957 | Hamer | 137/525 X |
| 2,942,614 | 6/1960 | Lardner | 137/525 X |
| 2,949,927 | 8/1960 | Mackal | 137/525 X |
| 3,401,719 | 9/1968 | Rosser | 137/525 X |
| 3,573,885 | 4/1971 | Brawn | 280/150 AB |
| 3,675,942 | 7/1972 | Huber | 280/150 AB |
| 3,733,091 | 5/1973 | Fleck et al. | 280/150 AB |
| 3,762,741 | 10/1973 | Fleck et al. | 280/150 AB |

Primary Examiner—David Schonberg
Assistant Examiner—John P. Silverstrim
Attorney, Agent, or Firm—Teagno & Toddy

[57] ABSTRACT

The system includes an inflatable collapsed confinement and a source of pressurized fluid operative upon receiving a signal from a collision sensor to expand a confinement to operative position. The confinement includes a separate inflatable tubular framework therein connected to the fluid pressure source for expanding the confinement. One-way valve means are provided in the confinement wall to permit entrainment of air into the confinement as it is expanded. The valve means includes secondary chambers inflatable upon expansion of the confinement to admit atmospheric air thereto with a portion of each chamber being formed by the confinement wall and the remainder thereof by excess material provided within the confinement and along the wall thereof. Apertures are provided in each of the secondary chambers in the portion thereof formed by the confinement wall and in the portion thereof formed by the excess material, with the latter apertures staggered from the former. Upon occupant impact, the secondary chambers collapse preventing fluid escape from the confinement. Vent means in the form of blow-out patches are provided in the confinement wall to prevent occupant rebound.

11 Claims, 8 Drawing Figures

INFLATABLE VEHICLE OCCUPANT RESTRAINT AND SYSTEM THEREFOR

BACKGROUND OF THE INVENTION

In the design and manufacture of inflatable vehicle occupant restraints, it is known to provide one-way valve means adjacent the inlet for the source of inflating fluid, to permit entrainment of air from the atmosphere in the vehicle occupant compartment into an inflatable confinement for occupant restraint. Previously known systems have been divided generally into two categories for permitting entrainment of air. In the first category are those systems in which a jet-type aspirator is used to fill the confinement. In this type system the momentum of the pressurized fluid as it leaves the inflating nozzle and enters the confinement creates a region of low pressure surrounding the fluid jet which causes the atmospheric air to be entrained into the confinement around the inflation jet. In the second category of confinement inflation aspirators, separate one-way valve means are provided adjacent the source of inflation fluid which valve means opens upon experiencing a negative gauge pressure in the confinement due to the rapid expansion of the confinement.

In the latter category of inflation aspiration system, it has been found that incorporation of valve means in the confinement creates mechanical difficulties in attaching bulky mechanical apparatus into an aperture formed in the thin material wall of the confinement.

SUMMARY OF THE INVENTION

The present invention provides an inflatable vehicle occupant restraint system having an inflatable confinement with a collapsed nonoperative position and an expanded operative position. The confinement is expanded to the operative position by supplying pressurized fluid to an inflatable framework disposed within the confinement. Pressurization of the inflatable framework causes the confinement to expand and one-way valve means are provided in the wall of the confinement which open during pressurization of the framework to permit entrainment of air from vehicle passenger compartment into the interior of the confinement. The one-way valve means are formed by providing patches having an excess of material, which attached to the inner periphery of the confinement wall to form chambers therebetween. Radially staggered apertures are provided in the confinement wall and in the excess material. Upon expansion of the confinement, the excess material expands away from the confinement wall to permit air to be entrained into the confinement through the apertures.

Upon impact of the inflated and expanded confinement by the vehicle occupant, the excess material portion of the aspiration valve collapses against the inner periphery of the confinement wall to otherwise prevent escape of air trapped within the confinement. The confinement of the present invention further employs blow-off or vent patches in the wall thereof to permit controlled exhaust of the air within the confinement upon contact by the vehicle occupant to prevent rebound.

The confinement of the present restraint system has the inflatable framework connected to the source of pressurized fluid for permitting rapid expansion of the confinement by pressurization from a relatively small volume of stored gas.

DETAILED DESCRIPTION

Figure 1:
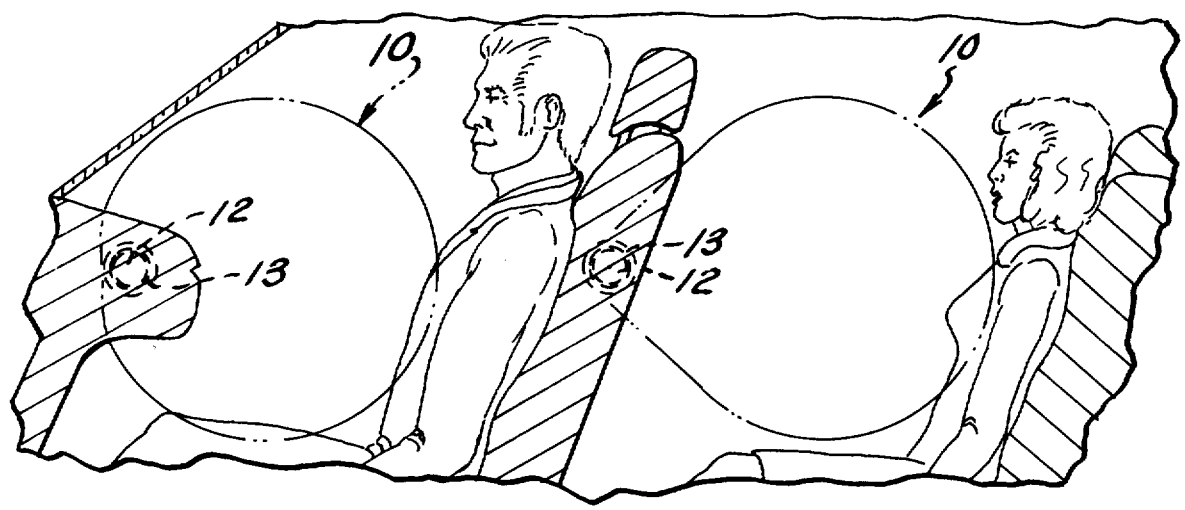
FIG. 1 is a side view of a portion of the occupant compartment of a passenger vehicle showing the position of the inflatable restraint in dashed outline.
Figure 2:
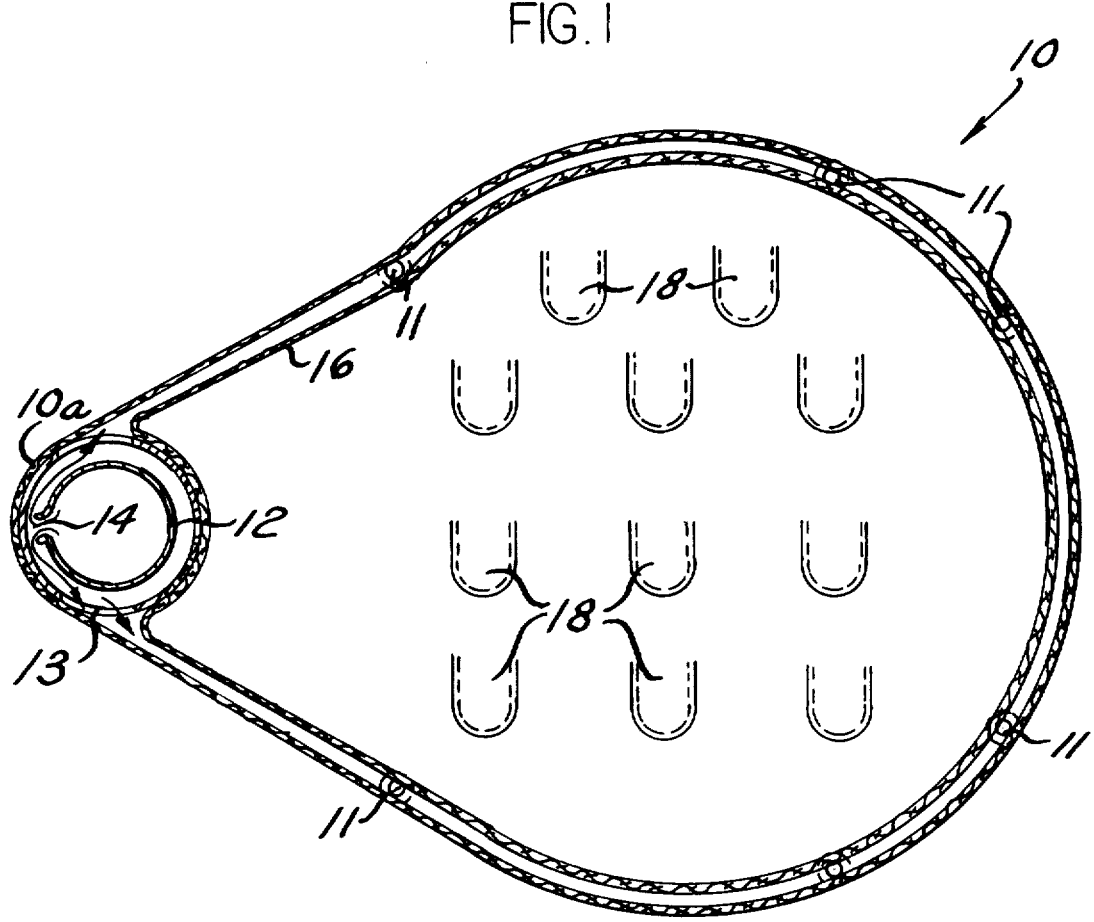
FIG. 2 is a cross section taken transversely of the vehicle showing the details of the fluid pressure source and construction of the wall of the inflatable confinement which is shown in the expanded operative condition.

Referring now to FIG. 1, the system of the present invention is shown employed in the passenger compartment of a motor vehicle wherein the system employs an inflatable confinement 10 having a collapsed inoperative position and an expanded operable position for contacting the vehicle occupant during a collision. In response to a collision, pressurized fluid is supplied to the confinement for expansion to the operable position from a source of pressurized fluid. Referring to FIG. 2, a typical source of fluid is shown as a cylindrical reservoir R of pressurized fluid. As is known in the art, a portion of the reservoir may be ruptured by any convenient explosive means activated in response to a collision signal to initiate fluid flow from the reservoir to the confinement.

The inflatable confinement is stored in the collapsed condition (not illustrated) closely adjacent the reservoir R. Upon the occurrence of a collision, fluid flows from the reservoir to confinement 10 and expands the confinement to the operable position shown in the drawings. The novel confinement 10 of the present invention has an inflatable tubular framework 11 provided along the wall thereof. In the presently preferred practice of the invention, the framework 11 is formed on the inner periphery of the wall of the confinement. However, the tubular framework 11 may also be formed integrally with the wall of confinement 10, or may alternatively be provided on the exterior periphery of the confinement 10.

The tubular framework is operable to receive fluid from the fluid supply, such as reservoir R, and expands rapidly upon inflation by virtue of the relatively small volume of fluid required to inflate the framework as compared to the volume of the inflated confinement 11. As the framework 11 is inflated, it expands the confinement 10 to the configuration shown in FIG. 2 during which expansion it is necessary that air be aspirated or drawn into the interior of the confinement.

Figure 3:
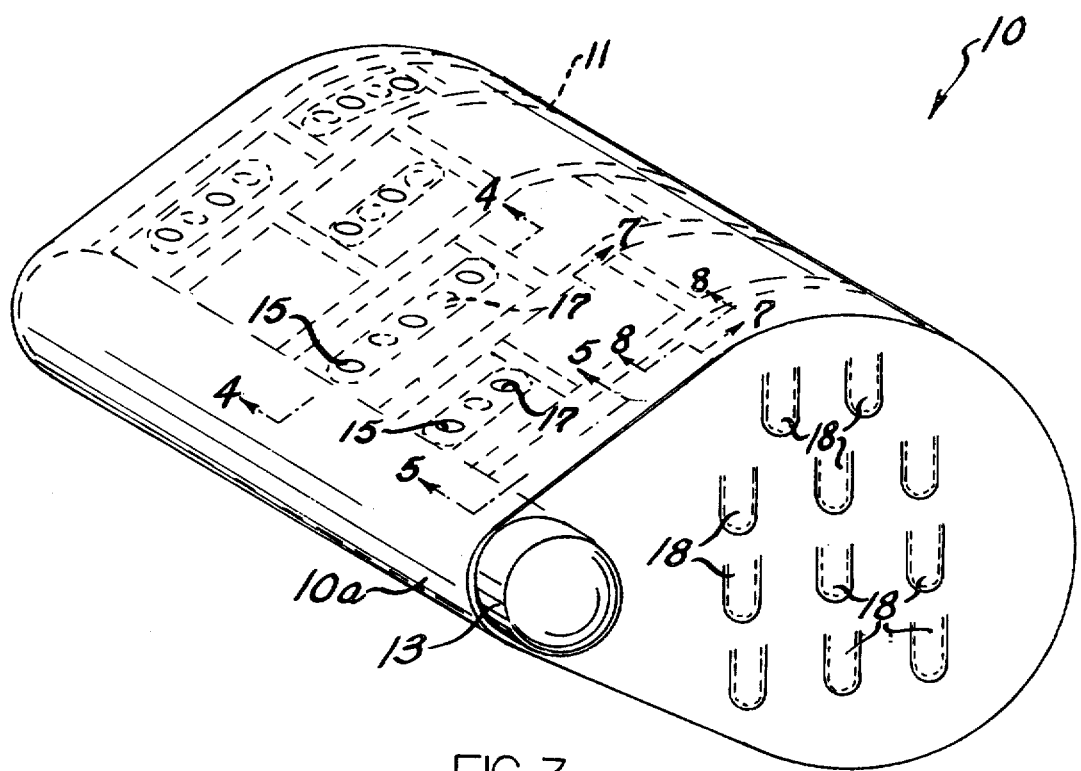
FIG. 3 is a perspective view of the diffuser and expanded confinement.

Referring now to FIG. 3 the means for permitting expanding of air into the confinement is illustrated as a plurality of one-way valve means provided in the wall of the confinement to admit entrained air and prevent escape of the entrained air when the confinement has been fully expanded to the operative position illustrated in FIG. 3.

Figure 4:
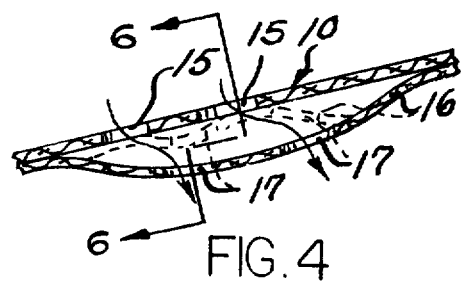
FIG. 4 is a fragmentary sectional view taken along section indicating lines 4—4 of FIG. 3.

Referring now to FIG. 4, the one-way valve means is illustrated in the present form as comprising a patch 16 having an excess of material provided on the interior of the confinement wall such that the having an excess of material forms a chamber between the inner surface of the confinement wall and the patch 16. The one-way valve means has apertures 15 formed in the wall of the confinement for permitting air to be entrained therethrough to the valve means of the confinement during the expansion thereof. At least one aperture 17 is provided in the patch having an excess of material 16 for each chamber and the apertures in the excess material are staggered radially relative to the aperture 15 formed in the wall of the confinement. In operation, the inflatable tubular framework 11 provided at the wall of the confinement is pressurized from the reservoir and as the framework 11 expands, the confinement expands. During expansion, the patch 16 having excess material 16 is expanded away from the wall of the confinement as a result of the decreasing pressure within the confinement, so as to form a chamber between the excess material 16 and the wall of the confinement, as illustrated in solid line in FIG. 4. Thus air is entrained through the apertures 15 into the chamber formed by the patch 16 having an excess of material 16 and through apertures 17 and into the interior of the confinement. Upon the confinement being fully expanded to the operative position, and subsequently impacted by the vehicle occupant, the tendency of the impact of the vehicle occupant to collapse the confinement causes positive pressurization within the confinement, which in turn collapses the patch 16 having an excess of material against the wall 10 of the confinement 10, as illustrated in dashed line in FIG. 4, to close the apertures 15 and 17 and prevent escape of fluid from the confinement.

Figure 6:
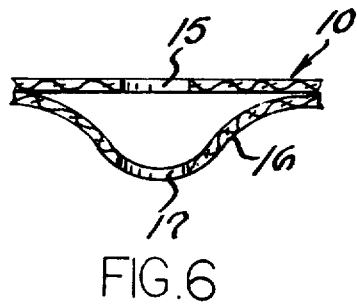
FIG. 6 is a fragmentary sectional view taken along section indicating lines 6—6 of FIG. 3 showing the excess material on the interior of the confinement in the expanded condition.

FIG. 6 illustrates the appearance of the patch 16 having an excess of material in the operative position during expansion of the confinement in a view generally at right angles to that of FIG. 4.

Figure 5:
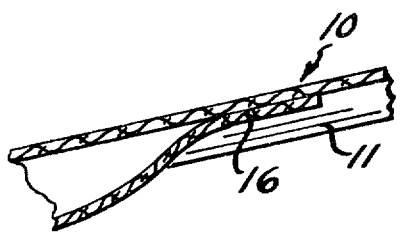
FIG. 5 is a fragmentary sectional view taken along section indicating lines 5—5 of FIG. 3.

Referring now specifically to FIGS. 3 and 5, the details of a portion of the confinement adapted for connection of the confinement 10 to a fluid supply diffuser 13 are shown wherein the confinement wall material has an extra piece of material 10a wrapped around the diffuser and seamed or joined in fluid pressure sealing arrangement to the wall of the confinement. The piece of extra material in cooperation with the wall of the confinement 10 thus forms a manifold about the diffuser for fluidic interconnection of the tubular framework 11 to the diffuser. The view of FIG. 5 is a typical cross sectional view of the manifold portion of the confinement taken at a station along the diffuser intermediate the individual tubes of the framework 11. For simplicity the diffuser 13 is not shown in FIG. 5.

Figure 7:
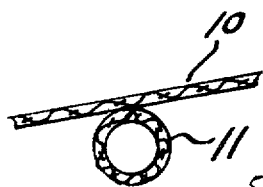
FIG. 7 is a fragmentary sectional view taken along section indicating lines 7—7 of FIG. 3.
Figure 8:
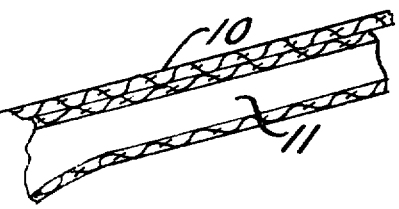
FIG. 8 is a fragmentary sectional view taken along section indicating lines 8—8 in FIG. 3 which shows a typical portion of the tubular framework for inflating the confinement.

Referring now to FIGS. 7 and 8, additional views of the attachment of the tubular framework 11 to the interior of the confinement 10 are illustrated for clarity.

FIG. 8 is a longitudinal section of one of the tubular members of the framework 11 and FIG. 7 is a transverse section of a typical member of the tubular framework 11.

Referring again to FIGS. 1 and 3, a plurality of blowoff patches or vents 18 is provided on the end walls of the confinement 10 for preventing rebound upon contact. Upon contact of the confinement by the vehicle occupant with the confinement in the expanded condition, the vents or patches 18 retain air in the expanded confinement until a predetermined level of positive interior pressure is obtained, at which pressure level the patches or vents 18 open or pop off, to permit immediate escape of air from the confinement 10. The particular construction of the vents or patches 18 will be a matter of choice as is known to those skilled in the art.

The present invention thus provides a novel vehicle occupant restraint system of the type wherein an expandable confinement is inflated by pressurized fluid from a reservoir. The restraint system of the present invention employs a unique confinement having an inflatable framework on the interior thereof for permitting rapid expansion of the confinement by a small volume of pressurized fluid. The confinement further employs novel one-way fabric valve means formed in the wall thereof for permitting aspiration of occupant compartment air into the interior of the confinement during the expansion thereof. The novel one-way valve means closes upon impact of the expanded confinement by the occupant to prevent undesired escape of the entrained air from the expanded confinement.

Modifications and variations of the present invention will be apparent to those having ordinary skill in the art and the invention is limited only by the following claims.

What is claimed is:

1. An inflatable vehicle occupant restraint system comprising:
   a. a fluid source means operative to emit fluid under pressure;
   b. an inflatable confinement having a collapsed inoperative condition and an expanded operative condition, wherein said confinement has, (i) an inflatable framework disposed adjacent the wall of said confinement and communicating with said fluid source means such that, upon inflation of said framework, said confinement is expanded to the operative condition, (ii) one-way valve means disposed in the wall of said confinement and operable to open upon inflation of said framework, and expansion of said confinement to permit atmospheric air to flow into the interior of said confinement, said valve means including at least one patch having an excess of material and having the entire periphery thereof attached to the wall of said confinement, said patch being expandable upon expansion of said confinement to define in cooperation with the confinement wall a secondary chamber and to open said valve means, said patch having at least one outlet aperture formed therein with the wall of said confinement having at least one inlet aperture formed therein, said wall aperture being staggered from said patch aperture, said patch being collapsible against the confinement wall to prevent air flow through said staggered apertures to close said valve means upon contact of the confinement by the vehicle occupant.

2. The restraint system defined in claim 1, wherein
   a. said fluid source means includes diffuser means; and,
   b. said confinement includes inflatable manifold means interconnecting said inflatable framework and said fluid source means.

3. The restraint system defined in claim 1 wherein said excess material exceeds in surface length the corresponding adjacent part of said confinement wall forming a part of said secondary chamber.

4. The system defined in claim 1, wherein said excess material exceeds by 4 percent the surface length of the adjacent portion of said confinement wall forming said secondary chamber.

5. The restraint defined in claim 1 wherein said inflatable framework has a volume substantially smaller than the volume of said confinement.

6. The restraint system defined in claim 1, wherein said inflatable confinement includes vent means provided in the wall thereof such that, upon sufficient deformation of the confinement in the expanded condition by contact with the vehicle occupant, said vent means is operable to permit air to escape from the interior of the confinement to prevent occupant rebound.

7. An inflatable vehicle occupant restraint comprising: an inflatable confinement having a portion thereof communicating with a source of inflating fluid, said confinement having a collapsed inoperative condition and an expanded operative condition, wherein said confinement has, (a) means defining a plurality of first inflatable chambers disposed adjacent the wall of said confinement and adapted for communicating with a source of pressurized fluid such that, upon inflation of said first chambers, said confinement is expanded to the operative condition; (b) one-way valve means disposed in the wall of said confinement and operable to open upon inflation of said first chambers and expansion of said confinement to permit atmospheric air to flow into the interior of said confinement, said valve means including at least one patch having an excess of material and having the entire periphery thereof attached to the wall of the confinement, said patch being expandable upon inflation of said first chambers to open said valve means, said patch having at least one aperture formed therein with the wall of said confinement having at least one inlet aperture formed therein, said wall aperture being staggered from said patch aperture, said patch being collapsible to prevent air flow through said staggered apertures to close said valve means upon contact of the confinement by the vehicle occupant.

8. The restraint defined in claim 7, wherein,
   a. said patch defines at least one secondary chamber formed in part by the wall of said confinement and said expandable portion, which portion is formed by excess material disposed on the inner periphery of said confinement.

9. The restraint defined in claim 8, wherein each of said second chambers has the said excess material at least 4 per cent greater in surface length than the adjacent confinement wall portion of each of said second chambers.

10. The restraint defined in claim 7, wherein
    a. said fluid source means includes diffuser means; and
    b. said confinement includes inflatable manifold means interconnecting each of said first chambers and said fluid source means.

11. The restraint defined in claim 7, wherein said inflatable confinement includes vent means provided in the wall thereof such that, upon sufficient deformation of the confinement in the expanded condition by contact with the vehicle occupant, said vent means is operable to permit air to escape from the interior of the confinement to prevent occupant rebound.

* * * * *